United States Patent

[11] 3,597,674

| [72] | Inventor | Harold G. Abbey<br>1130 Parker Ave., Detroit, Mich. 48214 |
|---|---|---|
| [21] | Appl. No. | 832,157 |
| [22] | Filed | June 11, 1969 |
| [45] | Patented | Aug. 3, 1971 |

[54] SOLID-STATE REGULATION OF POWER SUPPLIES
9 Claims, 2 Drawing Figs.

[52] U.S. Cl. ................................................. 321/5,
321/18, 321/24, 323/22 SC
[51] Int. Cl. ................................................. H02m 7/12
[50] Field of Search ................................................. 321/2, 5,
16, 18, 19, 21, 24; 323/22 SCR

[56] References Cited
UNITED STATES PATENTS

| 3,114,873 | 12/1963 | Love | 323/22 |
| 3,145,334 | 8/1964 | Berman | 321/18 X |
| 3,289,069 | 11/1966 | Todd | 321/18 |
| 3,373,337 | 3/1968 | Han-Min Hung | 321/19 X |
| 3,375,428 | 3/1968 | Mitchell | 321/18 |
| 3,383,579 | 5/1968 | Han-Min Hung | 321/24 X |
| 3,413,538 | 11/1968 | Hodges | 321/18 X |
| 3,414,798 | 12/1968 | Nielsen | 321/2 |
| 3,465,234 | 9/1969 | Phadke | 321/5 |
| 3,507,096 | 4/1970 | Hall et al. | 321/18 X |

*Primary Examiner*—William M. Shoop, Jr.
*Attorney*—Eugene F. Malin

ABSTRACT: A regulated power supply in which voltage from an AC power line is supplied through a power-regulating element, such as an SCR device, to a rectifier section whose DC output is supplied to a load. A relatively small sensing voltage, linearly reflecting current or voltage changes in the load circuit, is applied through a linear amplifier to the base of a proportional control transistor circuit. The sensing voltage, combined algebraically with a reference voltage is also applied to the emitter to produce in the collector output circuit a feedback voltage which is linearly proportional to the sensing voltage throughout a broad range. The feedback voltage is applied to the regulator element to adjust the output of the supply so as to compensate for said changes in the load circuit and thereby maintain a constant DC output.

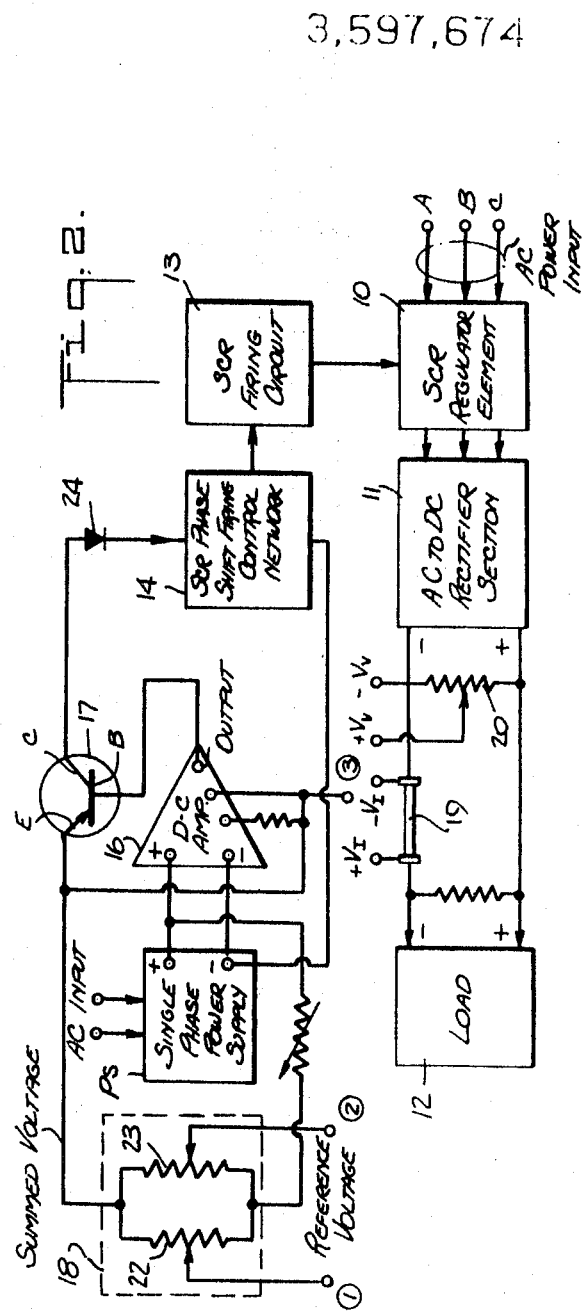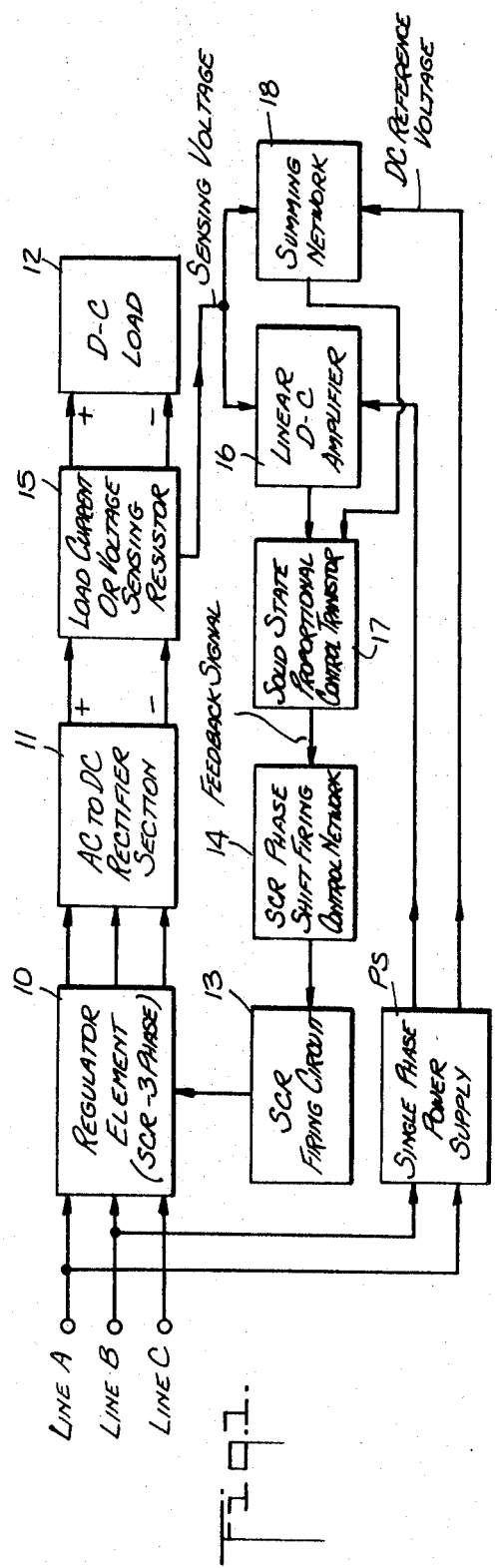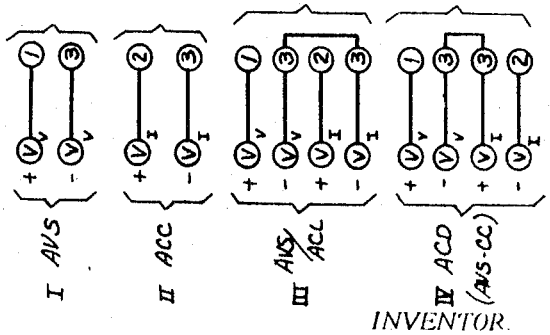

SOLID-STATE REGULATION OF POWER SUPPLIES

BACKGROUND OF INVENTION

This invention relates generally to regulated power supplies, and more particularly to a fast-acting and highly linear power regulation system.

The conventional power supply employs a transformer whose primary is connected to an AC power line and whose secondary is coupled to a rectifier section to produce a direct voltage output. The output level of the supply may be adjusted in various ways as by controlling the transformer primary voltage or turns ratio, or secondary voltage, by variable autotransformers, by tap switches, by the use of saturable reactors, and by other well-known expedients. Once the desired DC output voltage is established, it may be necessary to hold it constant in spite of line voltage or load changes. Most power supplies, therefore, require some kind of regulator to maintain a constant DC output.

Regulation is generally effected by a DC feedback signal produced by transducing a voltage or current component in the output circuit, the feedback signal being applied to a regulator element to vary the input of the supply in a manner maintaining a constant output. Thus in the case of a saturable reactor as the regulator element, the feedback signal is applied to the DC control winding thereof to control the line voltage so as to compensate for fluctuations in the DC output.

Another well-known technique for effecting regulation where control of large amounts of power is involved, is by means of thyratrons or ignitrons. These devices generally block AC voltage applied to the anode during a nonconducting period of each cycle and then suddenly permit current to flow during the remainder of the cycle or half-cycle. Equivalent effects are obtainable with silicon controlled rectifiers or SCR devices, by means of a firing circuit whose firing point is varied in response to a DC voltage feedback extracted from the rectified DC voltage or current output.

The common denominator of all self-regulating power-supply systems is the voltage or current feedback signal, depending on the mode of regulation desired. A voltage feedback signal is usually taken from a resistance divider in the output to provide the requisite level of feedback. In current feedback since input is proportional to output, a current transformer on one or more AC phases, supplies an AC signal which is rectified to provide a DC feedback signal to be applied to the regulator element. A more accurate current feedback signal may be derived directly from the DC output by a "transductor," which is a form of transformer wherein the DC output conductor serves as a primary, the transformer operating on the ripple content of the rectified DC output to generate an AC signal proportional thereto. This AC signal is rectified and applied to the regulator element.

Standard regulators for power supplies particularly those employing transductors either lack linearity or are linear within a narrow range, and therefore fail to maintain a constant output voltage. Moreover, the response time of standard regulators is relatively slow, due to transducting lags either in the AC current transformer or in the transductor system. Moreover standard regulators are relatively complex and costly.

BRIEF DESCRIPTION OF INVENTION

Accordingly, it is the main object of this invention to provide a regulated power supply in which the feedback signal applied to the regulator is linearly proportional to changes in supply output current or voltage and thereby acts to effect full compensation for such changes to maintain a constant output.

A significant aspect of the invention is that the proportional control circuit which derives the feedback signal from a sensing voltage taken from the output circuit of the power supply, is linear throughout a broad range of input values.

Also an object of the invention is to provide a regulated power supply which is adapted to operate in four distinct modes, namely in the AVS mode (Automatic Voltage Stabilization), the ACC mode (Automatic Current Control), AVS/ACL mode (Automatic Voltage Stabilization—Automatic Current-Limiting), and the ACD mode (Automatic Current Density—automatic voltage with current compensation).

Still another object of the invention is to provide a regulator which is efficient and reliable in operation, and which has an exceptionally rapid response time.

The linear and proportional feedback signal produced by a system in accordance with the invention may be applied to any form of power regulator to compensate for changes in output, including regulators of the type in which relays operate motorized inductors, saturable reactor regulators as well as firing circuits for varying the conduction cycles in SCR devices, or bias control circuits for power transistors. In all instances, the feedback signal acts to govern the action of the regulator as a linear functioning of the sensing voltage.

Briefly stated, these objects are accomplished in a regulated power supply wherein voltage from an AC line is supplied through a regulating element to a rectifier section whose DC output is applied to a load circuit. Incorporated in the load circuit is a sensing resistor which produces a sensing voltage linearly reflecting changes in output current or voltage.

A proportional control circuit is provided incorporating a transistor, and exploiting characteristics peculiar thereto. The sensing voltage is amplified and applied to the base of the transistor which, at the same time, the sensing voltage combined algebraically with a reference voltage is applied to the emitter, whereby the voltage established at the collector constitutes a feedback signal linearly proportional to the sensing voltage throughout a broad range of changes. The feedback signal is applied to the regulator element to so control power applied to rectifier sections as to maintain a constant output.

BRIEF DESCRIPTION OF DRAWING

For a better understanding of the invention, as well as other objects and further features thereof, reference is made to the following detailed description to be read in conjunction with the accompanying drawing, wherein:

FIG. 1 is a block diagram of a regulated power supply in accordance with the invention; and FIG. 2 is a schematic circuit diagram of the regulated supply.

DESCRIPTION OF INVENTION

Referring now to FIG. 1, there is shown a regulated DC power supply in accordance with the invention, in which a three-phase power source having lines A, B, and C providing voltages of the same amplitude, but displaced 120° in phase with respect to each other, are fed through a regulator element 10 to a rectifier section 11 whose DC output is applied to a DC load 12. Regulator element 10 is shown as being in the form of a three-phase input power control circuit making use of SCR devices.

The SCR regulator circuits may be conventional, such as those disclosed in the article on "Applying Silicon Controlled Rectifiers" appearing in *AUTOMATION* magazine, issue of Apr. 1966, or the circuits may be of the type disclosed in my copending application Ser. No. 520,240, filed Apr. 5, 1966, entitled "Full Wave Proportional Power Control System."

It is to be understood that the three-phase power supply disclosed herein is simply by way of illustration, and that the invention is applicable to single-phase systems using SCR regulators, or to other systems using saturable reactors or other regulator elements, such as motorized inductors responsive to a DC feedback signal to maintain a constant output. By way of example, there will be disclosed a control system in which regulation is effected by varying the firing angles of SCR devices.

Operating in conjunction with the SCR regulator 10 are gate firing circuits 13 which are of any known design, such as those disclosed by Brown in "Silicon Controlled Rectifier in Proportional Power Control," published in 1962 by Vectrol Engineering Inc., a subsidiary of the Sprague Electric Company.

An SCR device is a solid-state semiconductor which includes an anode and cathode, and a gate whose function is similar to that of a thyratron grid. Once triggered by a firing signal from the associated firing circuit, it continues to conduct anode current until the load current in the anode is brought to zero by external circuit means, such as a reversal of supply voltage or a momentary opening of the load circuit.

The firing circuit applies a trigger signal to the gate of the SCR device at a selected point over an 180° range of firing angles. Each firing circuit includes a phase-shifting network 14, the arrangement being such that the firing point or conduction angle may be varied as a function of an applied direct voltage. Thus a change in the applied direct voltage brings about a proportional shift in firing point.

It therefore becomes possible to regulate the power supply by applying to the control network 14 of the firing circuit, a DC feedback signal which reflects a variation in current or voltage in the DC output circuit of the power supply, and which acts to so vary the firing angle of the SCR devices as to compensate for this variation and thereby maintain a constant output voltage. The DC feedback signal which is applied to control network 14 is derived from a sensing resistor 15 in the load circuit of the power supply, the voltage drop thereacross being proportional to and representing a change in the DC output voltage or current, depending on the placement of the sensing resistor, as will be later explained.

The voltage from sensing resistor 15 is applied to a linear DC amplifier 16 whose output is applied as a bias to one electrode of a solid-state proportional control transistor circuit 17. The voltage from sensing resistor 15 is also applied to a summing network 18 on which is impressed a DC reference voltage from a power supply PS operated from one phase of the three-phase line, this supply also serving as the DC supply for amplifier 16. The voltage from summing network 18, which represents the resultant of the reference voltage and the sensing voltage from sensing resistor 15, is applied as a bias to another electrode of transistor circuit 17.

The output of transistor circuit 17 is a feedback signal which is linearly proportional to the sensed change in the power supply output and is applied to the phase-shift network 14 of the firing circuit to adjust the firing point to a degree which compensates for the change, thereby stabilizing the power output.

Referring now to FIG. 2, the system disclosed in FIG. 1 is shown in greater detail. It will be seen that load 12 is connected across the output of the power supply through a current-sensing series resistor 19 which, in practice, may be a meter shunt having an extremely low resistance to maintain optimum linearity and proportionality to current output, provided the resistance is substantially unloaded. The voltage drop across the sensing resistor may be in the 0-to-50, or 0-to-100 millivolt range. Terminals $-V_I$ and $+V_I$ across resistor 19 therefore provide a sensing voltage linearly representative of current changes in the power supply output. In low capacity power supplies, the sensing resistor output voltage may be in the microvolt range to obviate loading of the circuit.

To derive a sensing voltage linearly reflecting changes in the voltage output of the power supply, a voltage-sensing divider 20 is connecting across the supply output, the sensing voltage being established across terminals $-V_v$ and $+V_v$.

The linear DC operational amplifier 16 is supplied with DC operating power by reference power supply PS. This same supply applied to an adjustable reference voltage through a rheostat 21 to one junction of potentiometers 22 and 23 connected in parallel relation to form the summing network 18.

The adjustable sliders of potentiometers 22 and 23 are connected to terminals 1 and 2. Potentiometer 22 is for voltage adjustment, and potentiometer 23 is for current adjustment. The other junction of the summing network 18 is connected to the emitter electrode of transistor 17 which acts on the proportional control device. A terminal 3 is connected to the negative input terminal of linear amplifier 16 is also connected to the emitter of transistor 17, the output of the amplifier being connected to the base of the transistor.

The collector of transistor 17 is connected through a diode 24 to the phase-shift network 14 of the firing circuit 13 for the SCR regulator device 10. Thus the voltage from the collector of transistor 17 determines the firing point of the SCR circuit.

The arrangement shown is capable of operating in four modes of control, and we shall first consider the AVC mode, that is, automatic voltage stabilization. In this mode, the sensing voltage developed across terminals $-V_v$ and $+V_v$, of current sensing resistor 19 is applied between terminals 1 and 3. Thus the sensing voltage and the reference voltage are summed in network 18 and applied as a bias to the emitter of transistor 17. At the same time, the sensing voltage is amplified in linear amplifier 16 and applied as a bias to the base of transistor 17.

In a transistor at a particular value of base voltage, a change in emitter voltage produces a proportional change in collector current within a given zone up to a point of saturation, after which even a large change in emitter voltage has little effect on collector current. In other words, the transistor characteristic may be represented by a group of curves, each developed at a particular level of base voltage and each having a proportional and saturation zone.

In order, therefore, to extend the proportional zone to cover the full range of voltage changes applied to the emitter as a result of changes in sensing voltage or adjustments in the reference voltage applied to the summing network, the invention raises the base voltage as the voltage on the emitter is increased, thereby avoiding saturation and a nonlinear response and enlarging the proportional zone of the transistor to encompass the full range of sensing voltages applied thereto. Thus the output of the transistor is linearly proportional to the sensing voltage and provides the desired feedback to control regulator element 10.

In the second mode, ACC (Automatic Current Control), the terminals $-V_I$ and $-V_I$ at which the current-sensing voltage is established, are connected between terminals 2 and 3. Thus the voltage produced by summing network 18 is the algebraic sum of the reference voltage and the current-sensing voltage, this being applied as a bias to the emitter of the transistor 17. The sensing voltage is also amplified by amplifier 16 and applied as a bias to the base of the transistor to effect proportional control in the manner previously described.

To operate in the AVS/ACI mode (Automatic Voltage Stabilization—Automatic Current-Limiting), terminals $-V_v$ and $+V_v$ are connected to terminals 1 and 3, respectively, while terminals $+V_I$ and $-V_I$ are connected to terminals 2 and 3, respectively. Finally, to operate in the ACD mode (Automatic Current Density—automatic voltage with current compensation), terminals $+V_v$ and $-V_v$ are connected to terminals 1 and 3, respectively, while terminals $+V_I$ and $-V_I$ are connected to terminals 3 and 2, respectively.

While there has been shown and described a preferred embodiment of the invention, it will be appreciated that many changes and modifications made be made therein, without, however, departing from the essential spirit of the invention.

What I claim is:

1. A regulated power supply comprising:
   A. a rectifier section adapted to convert alternating current to direct current,
   B. a power regulator responsive to an applied direct voltage said element being interposed between an alternating current source and the input to said rectifier section,
   C. a load circuit coupled to the output of said rectifier section,
   D. means interposed in said load circuit to produce at least one sensing voltage linearly reflecting a change in load current or voltage,
   E. a proportional control circuit, including a transistor having two input electrodes and an output electrode, F. means to amplify said sensing voltage and to apply to as a bias to one input electrode of said transistor, G. means simultaneously to apply said sensing voltage algebraically combined with an adjustable reference voltage to the other input electrode to produce at said output electrode a feedback voltage linearly proportional to said sensing voltage, and H. means to apply said feedback voltage to said element to effect linear regulation of said supply.

2. A supply as set forth in claim 1, wherein said power regulator is an SCR device operating in conjunction with a gating circuit, a DC voltage-responsive means to vary the gating angle whereby the firing point of said device is controlled by said feedback voltage.

3. A supply as set forth in claim 1, wherein said power regulator is a variable time delay means to which the feedback voltage is applied to effect varying firing angles.

4. A supply as set forth in claim 1, wherein said sensing resistor is interposed in series with the load circuit to produce a sensing voltage as a function of changes in load current, said resistor being a low-resistance meter shunt whereby said sensing voltage is in the millivolt range.

5. A supply as set forth in claim 1, wherein said sensing resistor is a voltage divider connected across the load circuit to produce a sensing voltage as a function of changes in said voltage.

6. A supply as set forth in claim 1, wherein said amplified sensing voltage is applied to the base of said transistor, and said combined voltage to the emitter thereof.

7. A regulated power supply comprising:

A. a rectifier section adapted to convert alternating current to direct current, B. a power regulator responsive to an applied direct voltage said element being interposed between an alternating current source and the input to said rectifier section, C. a load circuit coupled to the output of said rectifier section, D. a sensing resistor interposed in said load circuit to produce a sensing voltage linearly reflecting a change in load current or voltage, E. a proportional control circuit, including a transistor having two input electrodes and an output electrode, F. means to amplify said sensing voltage and to apply it as a bias to one input electrode of said transistor, G. means simultaneously to apply said sensing voltage algebraically combined with an adjustable reference voltage to the other input electrode to produce at said output electrode a feedback voltage linearly proportional to said sensing voltage, H. means to apply said feedback voltage to said element to effect regulation of said supply, and whereby I. said voltage is produced in a summing network having a pair of potentiometers in parallel relation, a reference voltage being applied to one junction of the network, the other junction being connected to said other input electrode.

8. A supply as set forth in claim 7, wherein a sensing voltage from said resistor reflecting a change in load current is applied to the slider of one of said potentiometers.

9. A supply as set forth in claim 8, wherein a sensing voltage from said resistor reflecting a change in load voltage is applied to the slider of the other potentiometer.